United States Patent [19]

Nave

[11] 4,368,618
[45] Jan. 18, 1983

[54] MANUALLY OPERATED METERING VALVE FOR A FUEL CONTROL

[75] Inventor: William E. Nave, South Bend, Ind.
[73] Assignee: The Bendix Corporation, Southfield, Mich.
[21] Appl. No.: 193,229
[22] Filed: Oct. 2, 1980
[51] Int. Cl.³ .............................................. F02D 33/00
[52] U.S. Cl. ................................................ 60/39.28 R
[58] Field of Search ................................... 60/39.28 R
[56] References Cited
FOREIGN PATENT DOCUMENTS
2018363 10/1979 United Kingdom ........... 60/39.28 R

*Primary Examiner*—Gerald A. Michalsky
*Attorney, Agent, or Firm*—Leo H. McCormick, Jr.; Ken C. Decker

[57] ABSTRACT

A fuel control having an electrically operated metering valve and a manually operated metering valve through which fuel is independently scheduled to an engine. During normal operation, the electrically operated metering valve controls the flow of fuel to the engine in response to an operator input signal. Linkage connected to a power lever supplies the manually operated metering valve with an input corresponding to the fuel flow requirement requested by the operator of the electrically operated metering valve. The manually operated metering valve is connected to the source of fuel through an electrically operated transfer valve. Should an electrical failure occur, the electrically operated transfer valve is deactivated and if the fuel flow requirement is below a fixed level, fuel flows from the source through the manually operated metering valve without moving the power lever to maintain a substantially constant engine speed.

11 Claims, 3 Drawing Figures

MANUALLY OPERATED METERING VALVE FOR A FUEL CONTROL

BACKGROUND OF THE INVENTION

This invention relates to a transfer valve apparatus for activating a backup metering valve through which the flow of fuel to an aircraft engine is scheduled as a function of an operator input and the discharge pressure produced by a compressor in the engine when a malfunction occurs in a primary metering valve.

In a known fuel control system disclosed in U.S. Pat. No. 4,033,112, a backup metering valve responds to a manual input for supplying fuel to an engine in the event that a malfunction occurs in the primary metering valve. During manual operation, surging of the engine could occur which would cause the compressor of the engine in the aircraft to stall if the rate of fuel flow increases too rapidly.

It is well known that as the speed of a compressor increases, the weight flow of air through the compressor must also increase. However, there is a limit to the rate at which airflow can be increased. The compressor which pumps air by means of blades, is dependent on smooth aerodynamic airflow in order to function properly. If the rotational speed of the compressor is accelerated faster than the airflow can accelerate, the smooth airflow required is interrupted and turbulence occurs. This turbulence reduces the airflow to the combustion chamber resulting in too great a volume of fuel in the combustion chamber. Thus, the fuel flow to the engine and the airflow must be matched with each other in order for the engine to operate effectively in meeting an input request of an operator.

In copending U.S. patent application Ser. No. 137,659, filed Apr. 7, 1980, it was discovered that the operation of a manually operated backup valve could be modified by a compressor pressure signal and thereby match the fuel flow with the airflow during acceleration to prevent surging. However, in this fuel control it is necessary to move a power lever to a separate operating range on the power lever in order to manually schedule fuel to the engine. Unfortunately, when the power level is moved out of the backup operating range to the cutoff position, the transfer valve is deactivated and fuel scheduled through the electrically operated metering valve at its failed position, causes the engine to surge. If an engine surge occurs during a landing, the control needed to safely land an aircraft is jeopardized.

SUMMARY OF THE INVENTION

In the present invention, a transfer valve apparatus in a full management system having a primary metering valve and a secondary metering valve controls the flow of fuel from a source to an engine in response to an operational signal applied to a power lever. A sensor responsive to an electrical malfunction in the primary metering valve supplies the transfer valve apparatus with a transfer signal for switching the scheduling of fuel from the primary metering valve to a backup or secondary metering valve when the fuel requirement is below a predetermined value without moving the power lever. Linkage connected to the power lever positions the backup or secondary metering valve to schedule fuel to an engine at substantially the same flow requirement as the primary metering valve. During initial movement of the power lever the linkage engages a stem in a control valve arrangement to open a port through which an area on a cylindrical body is connected to the sensor.

When the fuel flow requirement is below that indicated by a fixed position on the power lever should a malfunction be detected by the sensor, fuel flows from the source through the port and acts on the area to move the cylindrical body in opposition to a spring and open a relief port. With the relief port opened, fuel from the source acts on and moves a piston in the transfer valve apparatus to allow fuel to freely flow to the backup metering valve. Since the backup metering valve is positioned to schedule fuel at substantially the same rate as the primary metering valve, the engine operation is not changed and thus surging is avoided.

Once the power lever is moved past the fixed position, the linkage disengages from the stem to allow the spring to move the cylindrical body and close the port. Should the sensor detect an electrical malfunction with the power lever in this position, fuel from the source is communicated to the port. However, the cylindrical body remains stationary until such time as the power lever is rotated to the fixed position or below and the linkage engages the stem to open the port. With the port opened, the valve arrangement is actuated and fuel from the source flows to the backup metering valve.

A switch is connected to the sensor to prevent the primary metering valve from being reactivated if the malfunction should be corrected during the operation of the backup metering valve without moving the power lever to the cutoff position. Thus, once the backup metering valve is brought into operation, the scheduling of fuel to the engine is controlled by the movement of the power lever by the operator.

It is an advantageous effect of this invention to provide a fuel control for an aircraft engine with a transfer valve arrangement that prevents the shifting from a backup metering valve to a primary metering valve on movement of a power lever once the backup metering valve has been activated without moving the power lever to the fuel cutoff position even with correction of the reason for the transfer from the primary metering valve to the backup metering valve.

It is another advantage of this invention to provide a backup metering valve in a fuel control system with linkage connected to a power lever such that the fuel flow schedule presented to a primary metering valve by the power lever is simultaneously presented to the backup metering valve and with a shift in operation from the primary metering valve to the backup metering valve, fuel flow scheduling is achieved without surging occurring in the engine connected to the primary and backup metering valve.

It is an object of this invention to provide a fuel control with a malfunction sensor through which a transfer valve arrangement is activated to switch the scheduling of fuel to an engine from a primary metering valve to a backup metering valve without causing surging of the engine.

It is a further object of this invention to provide a transfer valve responsive to a signal from a malfunction detector with a switch that prevents the shifting from a backup metering valve to a primary metering valve once the backup metering valve has been activated without movement of a power lever to the off position.

These and other advantages and objects should be apparent from reading this specification and viewing the drawings.

DETAILED DESCRIPTION OF THE INVENTION

Figure 1:
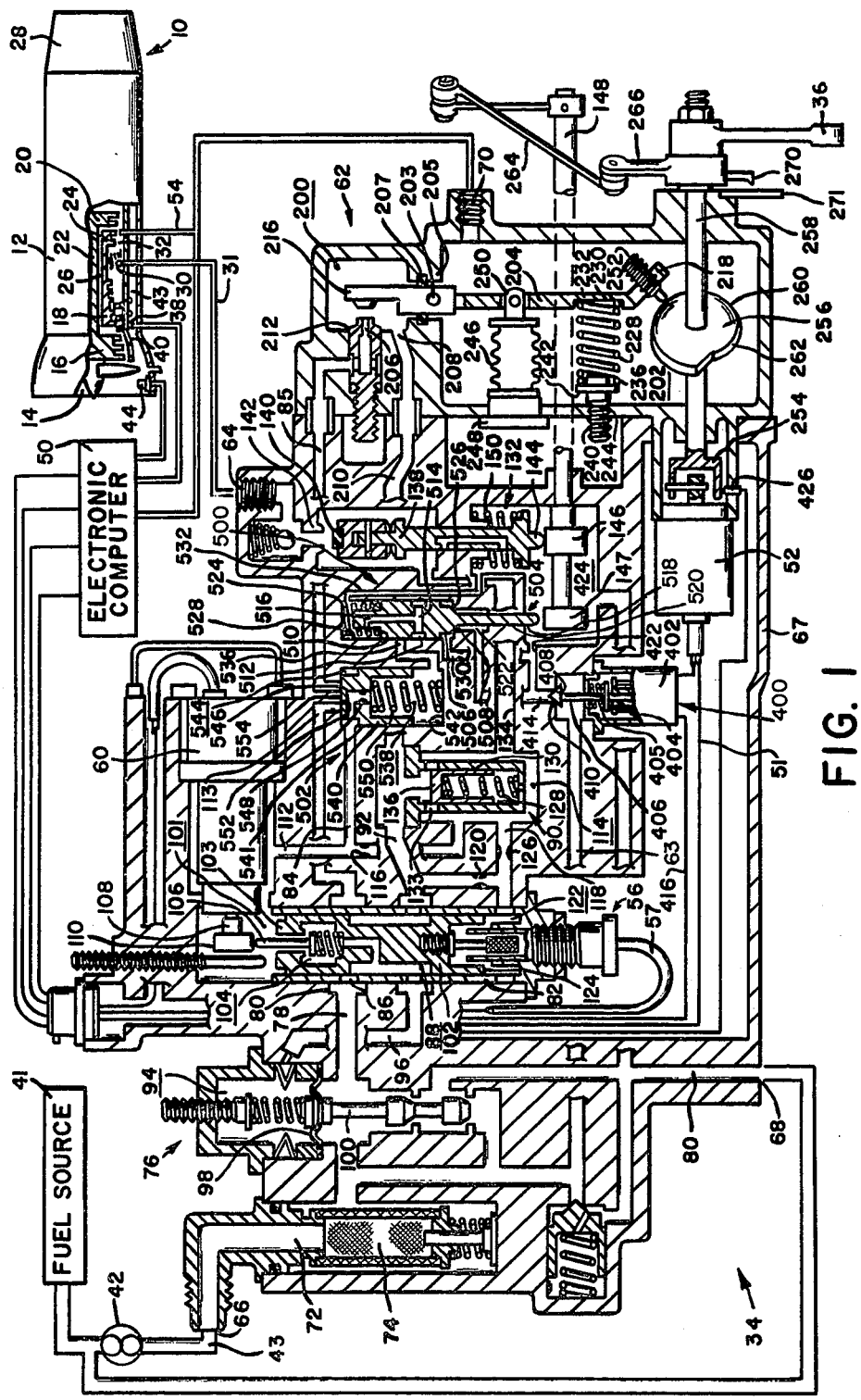
FIG. 1 is a schematic illustration of a turbine engine having a sectional view of a fuel control with a primary metering valve malfunction sensor and transfer valve arrangement for switching from the primary metering valve to a backup metering valve made according to the principles of this invention.

The turbine engine 10 for use in an aircraft as shown in FIG. 1 has a housing 12 with an air inlet 14, a first stage air compressor 16, a second stage air compressor 18, a first turbine 20 connected by shaft 22 to the first stage compressor 16, a second turbine 24 connected by shaft 26 to the second stage compressor 18 and an exhaust nozzle 28. A plurality of fuel nozzles 30 which are located in a combustion chamber 32 receive fuel from a fuel control mechanism 34 in response to an operator input to a power lever 36. The fuel in chamber 32 and the air supplied thereto by the first and second stage air compressors 16 and 18 is combined as a fuel-air mixture and burned to generate a thrust as the products of combustion pass through exhaust nozzle 28.

The volume of air which is communicated to combustion chamber 32 is determined by the position of vanes 38 with respect to second stage compressor 18 to create a variable geometry flow path between shroud 40 and the second stage compressor 18 with any excess air being communicated to the rear of housing 12 through flow ducts 43.

The fuel supplied to nozzle 30 is metered flow from a positive displacement pump 42 that is driven by the output of the turbine 20 in a manner well known in the field of turbine engines.

The fuel-to-air ratio determines the temperature of the hot gases entering the turbine from combustion chamber 32. If the fuel flow through nozzles 30 is increased, the temperature of the air passing through combustion chamber 32 is proportionally increased to supply added thermal and pneumatic energy to rotate turbines 20 and 24 while at the same time increasing the thrust of the exhausted gases through nozzle 28.

In order to obtain optimum thermal efficiency and maximum thrust, the turbine inlet temperature is maintained as close to the allowable limits as possible. Thus, a temperature probe 44 is located in inlet 14 to monitor the temperature of the air that is supplied to the first and second stage compressors 16 and 18. The output of the temperature probe 44 is connected to an electronic sensing and computing member 50.

The electronic sensing and computing member 50 receives a first signal from transducer 52 representing the position of the power lever 36, a second signal representing the compressor discharge pressure through conduit 54, a third signal representing the engine speed and other engine parameters in order to supply the primary metering valve 56 with an electrical operational signal; and supplies sensor or solenoid 400 in transfer valve arrangement 500 with an electrical operational signal. The electrical operational signal activates the metering valve 56 to schedule fuel to the engine in a manner fully described in U.S. Pat. No. 4,033,112.

To increase or accelerate the turbine speed or engine thrust, it is necessary to provide excess fuel flow above the amount required to run the engine at a fixed speed. However, the rate at which the engine speed can safely be increased is limited by the following engine operational factors: (a) the maximum allowable turbine inlet temperature; and (b) compressor stall. The electronic sensing and computing member 50 takes into account both inlet temperature and compressor pressure in providing the primary metering valve 56 with an operational signal.

If a malfunction should occur in the electronic system which would render the electronic sensing and computer member 50 inoperative, the requested fuel flow from the fuel control mechanism 34 would not respond to the power lever in the primary operational setting. However, a stepper motor 60 is designed to hold the metering valve 56 in a fixed position should such a failure occur. Thereafter, if an operator attempts to change the fuel flow requirement by use of the power lever 36, nothing happens until such time as the fuel control 34 is switched to a backup mode by actuation of the transfer valve arrangement 500 in which a backup metering valve 62 is manually operated.

The backup metering valve 62, while part of the fuel control 34, is independent of the primary or electrically operated metering valve 56. When the operator moves the power lever to the backup position, a transfer valve 65 is activated to provide a flow path for a first volume of fuel that is added to an idle volume of fuel that is always available from the metering valve 56 for distribution to the engine 10 through outlet port 64.

The backup metering valve 62 receives an operational signal corresponding to the pressure produced by the compressors 16 and 18 to proportionally schedule fuel to the engine during acceleration until the fuel flow is equal to that requested by the position of the power lever 36. Since the volume of fuel added by the backup metering valve 62 is substantially controlled by the output pressure of the compressors 16 and 18, surging of the engine is avoided and the operator should have sufficient control of the engine to thereafter maneuver an aircraft.

In more particular detail, the fuel control 34 is substantially identical in structure and operation as the fuel control disclosed in U.S. patent application Ser. No. 137,659 with the exception of sensor 400 and transfer valve arrangement 500 through which fuel is supplied to the backup metering valve 62. Therefore, only the structure of the sensor 400 and transfer valve arrangement 500 shall be described in explicit detail.

The fuel control 34 has a housing 67 with an entrance port 66 connected to pump 42, a bypass port 68 connected to the fuel reservoir 41, and outlet port 64 connected by conduit 31 to nozzles 30 in the engine and a sensor port 70 connected to conduit 54 for receiving a pressure signal representative of the output pressure produced by the compressor 18 in the engine 10.

A supply conduit 72 connects the inlet port 66 with a filter 74 in housing 65. Clean fuel flows from filter 74 to a bypass valve 76 and conduit 43 connected to sensor 400. Depending on the fuel requirement, a first portion of the fuel received by the bypass valve flows to the metering valve 56 through passage 78 and a second portion or excess of the fuel is returned to the reservoir 41 through passage 80 by way of the bypass port 68.

The supply passage 78 is connected to a metering chamber 88 in metering valve 56 by an orifice 86 in sleeve 82. A groove 80 forms a flow path around the sleeve 82 to provide communication from supply passage 78 to passage 84 connected to a flow control valve 502 in the transfer valve arrangement 500. Conduit 85 connects the flow control valve 52 with the backup metering valve 62.

The metering chamber 88 is connected to a pressure differential valve 90 by passage 92 and to a control chamber 94 in the bypass valve 76 by a passage 96.

The difference in pressure between the fluid pressures in control chamber and in supply conduit 78 act on a diaphragm 98 to position valve 100 and thereby control the volume of fuel returned to reservoir 41 through bypass passage 80.

A spool 102 in the electronic metering valve 56 has a passage 104 for connecting the metering chamber 88 with chamber 101. The stepping motor 60 has a shaft 108 with a cam surface 110 on the end thereof which engages a stem on servo valve 106 to establish fluid communication between the metering chamber 88 and distribution chamber 114 in the pressure differential valve 90 through passage 112. A restriction 116 in passage 112 causes a pressure drop in the fluid communicated to the distribution chamber 114.

Passage 92 is also connected to chamber 114 through passage 118. However, a first restriction 120 in passages 118 causes a first pressure drop in the fluid communicated from passage 82 to create a first control fluid. This first control fluid is communicated to chamber 122 where it acts on end 124 of spool 102 to oppose the force created by fluid in chamber 101 acting on end 103 of the spool 102.

A second restriction 126 is located in passage 118 between the first restriction 120 and the distribution chamber 114 to create a second pressure drop in the fluid communicated from passage 92. This second restriction prevents rapid fluid flow from chamber 122 which could cause oscillations of spool 102.

The combined force of the fluid which has experienced two pressure drops in conduit 118, the fluid which has experienced a single pressure drop in conduit 112 and the spring 128 act on piston 130 to oppose the movement of piston 130 by the force of the fluid in passage 92. When the force of the fluid in passage 92 is sufficient to move piston 130, orifice 133 is opened and fluid from passage 92 flows into distribution chamber 114.

Distribution chamber 114 is connected to cut off valve 132 by a passage 134.

Cutoff valve 132 has a body 138 with a first end 140 located in passage 137 adjacent seat 142 of outlet port 64 and a second end 144 which is urged toward a surface on cam 146 located on shaft 148 in the power lever assembly 36 by a spring 150. Once the power lever 36 is moved from the cutoff position, spring 150 holds body 138 in a fixed position as shown in FIG. 1.

The above-described components function to define the primary metering valve 56 for scheduling fuel to the engine 10 in response to an input to the power lever 36 by the operator and the output of the electronic sensor and computing member 50.

The remaining components in the fuel control 34 substantially make up the backup metering valve 62.

The metering valve 62 has a first chamber 200 and a second chamber 202 located in housing 65. Chamber 200 which is separated from chamber 202 by a wall 205 has a first orifice 206 connected to passage 85 and a second orifice 208 connected to outlet port 64 by passage 210. A valve seat 212 is located in orifice 206 to provide a controlled flow of fluid from passage 84 into chamber 200.

Sensor port 70 is located in the housing 65 to communicate a pressure signal corresponding to the output of the compressor into the second chamber 202.

A lever 204 has a first end 216 located in chamber 200 and a second end 218 located in the second chamber 202. A pin 203 fixes the lever 204 to the housing 65 and a seal 207 surrounds the lever 204 to prevent communication between chambers 200 and 202. A face 222 is located on the first end adjacent valve seat 212.

A spring 228 located in chamber 202 has a first end 230 positioned in a groove 232 in the lever 204 and a second end 236 that engages a rib member 242 on bolt 240. Bolt 240 which extends through a threaded opening 244 in housing 65 can be adjusted to move rib 242 with respect to housing 65 and correspondingly cause lever 204 to pivot on pin 203 and adjust the position of face 222 with respect to valve seat 212.

An evacuated bellows 246 located in chamber 202 has a first end 248 fixed to housing 65 and a second end 250 connected to lever 204. The pressure signal supplied to chamber 202 representing the output pressure of the compressors 16 and 18 acts on bellows 246 to provide a force that opposes the force of the spring 228 on the lever 204. During the operation of the primary metering valve 56 of the fuel control 34 adjustable projection 252 on the second end 218 of lever 204 engages cam 256 on shaft 258 connected to power lever 36 to position face 222 with respect to valve seat 212 such that approximately the same fuel flow could be scheduled through the backup metering valve 62 as through the primary metering valve 56.

The power lever 36 which is attached to shaft 258 has a projection 266 attached to linkage 264 for connecting shaft 258 with shaft 148 and an indicator 270 for providing an operator with a visual indication of the position of shaft 258. The linkage 264 is designed to insure rotation of shaft 258 by power lever 36 is correspondingly transmitted to shaft 148 to open the cutoff valve 132 through the relationship of spring 150, body 138 and cam 146 and to actuate a condition valve 504 in the transfer valve arrangement 500 during rotation of the power lever from a start position up to a predetermined fuel flow condition.

The transfer valve arrangement 500 which includes the flow control valve 502 and the condition valve 504 responds to a transfer signal from sensor 400 to control the flow of fuel from pump 42 and flow of fuel present in conduit 84 to the backup metering valve 62.

The sensor 400 includes a solenoid 402 with a coil 404 connected to the electronic computer 50, a plunger 406 with a face 408 extends into conduit 63. During operation of the primary or electrically operated metering valve 56 electrical energy is supplied to coil 404 which moves face 408 against a seat 410 to surrounding outlet port 412 to prevent the flow of fuel from the supply conduit 72 through conduit 63.

Outlet port 412 is connected to the condition valve 54 by a conduit 414. Plunger 406 remains in the position shown in FIG. 1 as long as the primary or electrically operated metering valve 56 is in operation. Should an electrical failure occur in the primary metering valve 56 lead 416 which is tied to lead 51 of the primary metering valve 56 in the electronic computer ceases to carry electrical current or energy to coil 404. With coil 404 deenergized, spring 420 acts on plunger 406 to move face 408 away from seat 410 and allow fuel to be communicated with conduit 414. A minimum fuel flow occurs through conduit 63 since conduit extension 422 connected to conduit 414 is opened to reservoir 424 in housing 65. Reservoir 424 is connected to fuel return conduit 80 so no fuel is lost to the system.

The electronic computer 50 includes a latching relay which is connected to coil 404 and switch 426 located adjacent yoke 254 on shaft 258. When coil 404 has been deenergized, yoke 254 must engage switch 426 before electrical energy is transmitted to coil 404. While any position could be selected for yoke 254 to engage switch 426 in order to assure that fuel flow is not switched back to a failed position established by stepper motor 60 on movement of the power lever, the yoke 254 only contacts the switch when the power lever is moved to the off position.

The condition valve 504 includes a cylindrical body 506 with a first face 508 and a second face 510. The cylindrical body 506 has a cross bore 514 and an axial bore 516 that connects groove 512 with the second face 510. A stem 518 which projects from the first face through port 520 of chamber 522 extends through the housing 67 into chamber 424. A spring or resilient member 524 acts on end or face 510 to urge the first face 508 against seat 526. The spring 524 force is such that the pressure of the fuel in conduit 414 acting on the area of the face 508 between the seat 526 and stem 522 is insufficient to overcome spring 254.

The flow control valve 502 has a piston 540 which separates a bore 542 into a flow chamber 544 and a relief chamber 534. Passage 84 communicates fuel from the supply conduit into flow chamber 544. A passage 546 communicates fuel from chamber 544 to the relief chamber 534. A restriction 548 controls the rate of communication between chamber 544 and 534. A spring 550 acts on piston 540 to urge face 552 against a seat 554 to prevent the communication of fuel from chamber 544 into conduit 85 going to the backup metering valve and conduit 113 going to chamber 101 adjacent stepping motor 60. As long as the cylindrical body 506 closes passage 536, spring 550 holds piston 540 in the position shown in FIG. 1 and fuel is scheduled to outlet port 64 through the primary metering valve 52. Bore 528 in which cylindrical body 506 is located is connected to chamber 424 by a first passage 530 and a second passage 532 and to chamber 534 in flow control valve 502 by passage 536. As long as the power lever 326 is located above a predetermined fuel flow requirement cam 147 remains out of contact with stem 522 and face 508 remains seated even though fuel could be flowing in conduit 414 with face 408 on plunger away from seat 410 because of the absence of electrical energy to coil 404.

MODE OF OPERATION OF THE INVENTION

In order to initiate starting of the turbine engine 10 shown in FIG. 1, the power lever is moved from the off to the idle position, as shown by the position of indicator 270 over dial 271. In moving the power lever 36 to the idle position, shaft 258 rotates to provide transponder 52 with an input signal that is transmitted into the electronic sensing and computing member 50 through lead 51. At the same time, shaft 148 is rotated by the movement of linkage 264 to allow spring 150 to move end 144 toward cam 146 and open the cutoff valve 132 and cam 147 to engage stem 522 to hold face 508 away from seat 326 to open passage 414 to passage 530 connected to reservoir 424.

The electronic sensing and computing member 50 provides stepping motor 60 and the primary metering valve 56 with an electrical signal corresponding to the fuel flow requirement to start the engine 10.

The positive displacement pump 42, flows fuel from source 41 into supply conduit 43 for distribution to nozzle 30 in combustion chamber 32 by way of fuel control 34. As fully disclosed in U.S. Pat. No. 4,033,112 the electronic sensing and computing member 50 controls the operation of the metering valve 56 to schedule fuel to nozzles 30 in response to an operator input applied to the power lever 36.

As long as electrical energy is available, the electronic sensing and computing member 50 controls the volume of fuel supplied to the engine in response to an input applied to the power lever 36.

Figure 2:
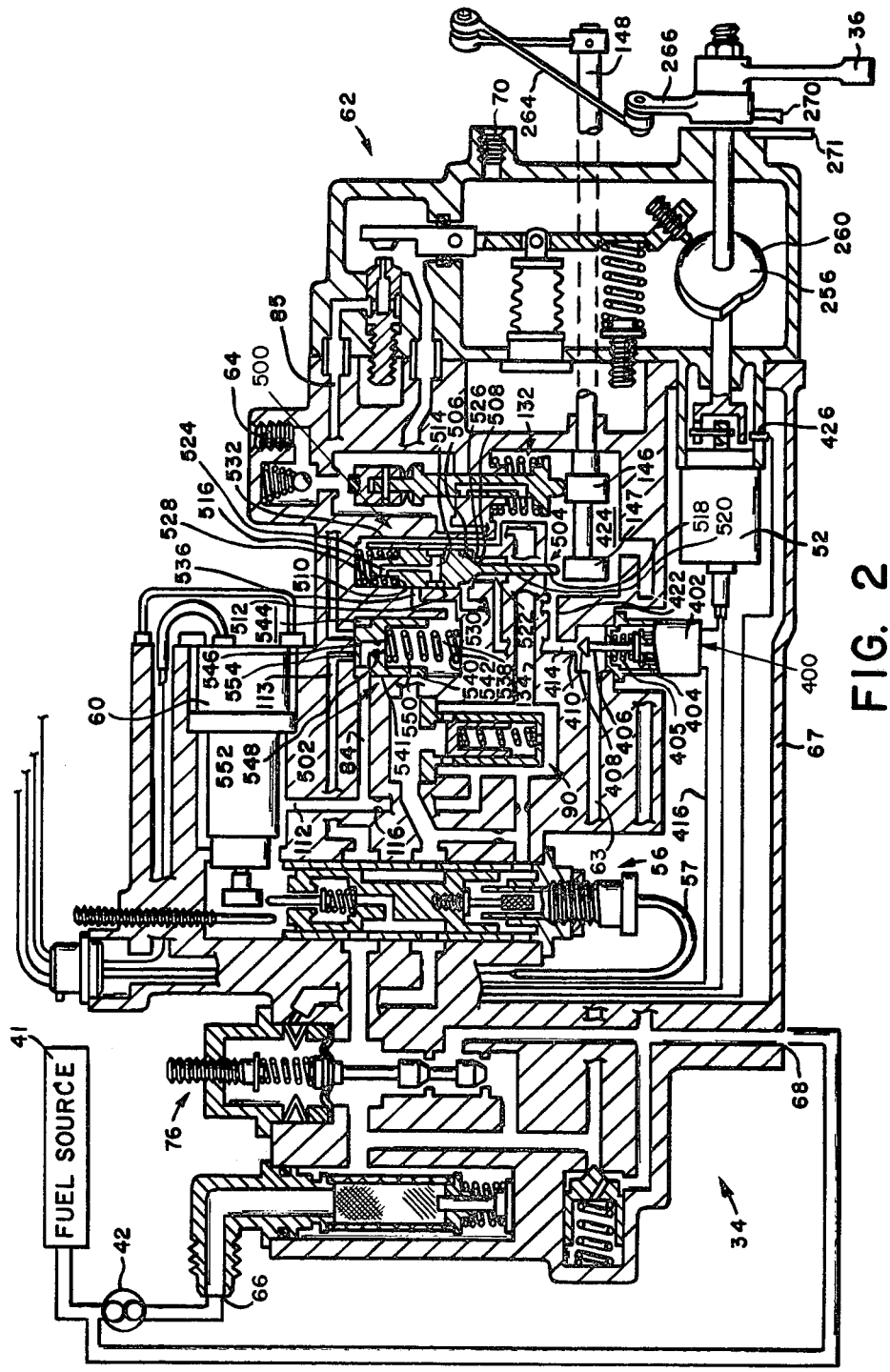
FIG. 2 is a schematic illustration of the fuel control of FIG. 1 showing the operation of the malfunction sensor after a malfunction of the primary metering valve with a fuel flow scheduling requirement as indicated by a power lever above a fixed value.

If an electrical power failure or malfunction occurs, the electrical energy or current that is supplied to coil 404 terminates and spring 405 acts on plunger 406 to move face 408 away from seat 410 to communicate fuel from source present in conduit 63 into conduit 414 as shown in FIG. 2. With any electrical malfunction in the primary metering valve 56 the operator is informed of this condition by some type of visual or sensual indicator.

The fuel flow requirement corresponding to the power lever 36 position continues to flow to the engine at a fixed rate even though the power lever 36 is thereafter moved since stepping motor 60 is designed to remain in a stationary position. Even though the engine 10 continues to operate after an electrical malfunction, the operator would not have sufficient control over the engine 10 to meet all the requirements to maneuver the aircraft without endangering the aircraft.

Therefore, in order to achieve greater control over the operation of the engine 10 the operator must shift to the backup metering valve 62.

In order to change into the backup mode of operation the power lever 36 must be rotated back to the predetermined fuel flow requirement, typically this is selected at about half the operating range of cam 60. At this position, cam 147 engages stem 520 to move face 508 away from seat 526. The fuel from source or supply conduit present in conduit 414 acts on the first area 508 to overcome spring 524 and move groove 512 adjacent passage 536 to vent relief chamber 534 to chamber 424 by way of passages 514, 516, bore 528 and passage 532.

With relief chamber 534 vented to chamber 424, which is essentially at or near atmospheric pressure, a pressure differential is created across piston 540 between the fuel in chambers 544 and 534. This pressure differential acts on face 541 to develop a force that overcomes spring 550 and moves face 552 away from seat 554 to allow fuel from the supply conduit 78 to simultaneously flow through conduit 113 to chamber 101 and through conduit 85 to chamber 200.

Figure 3:
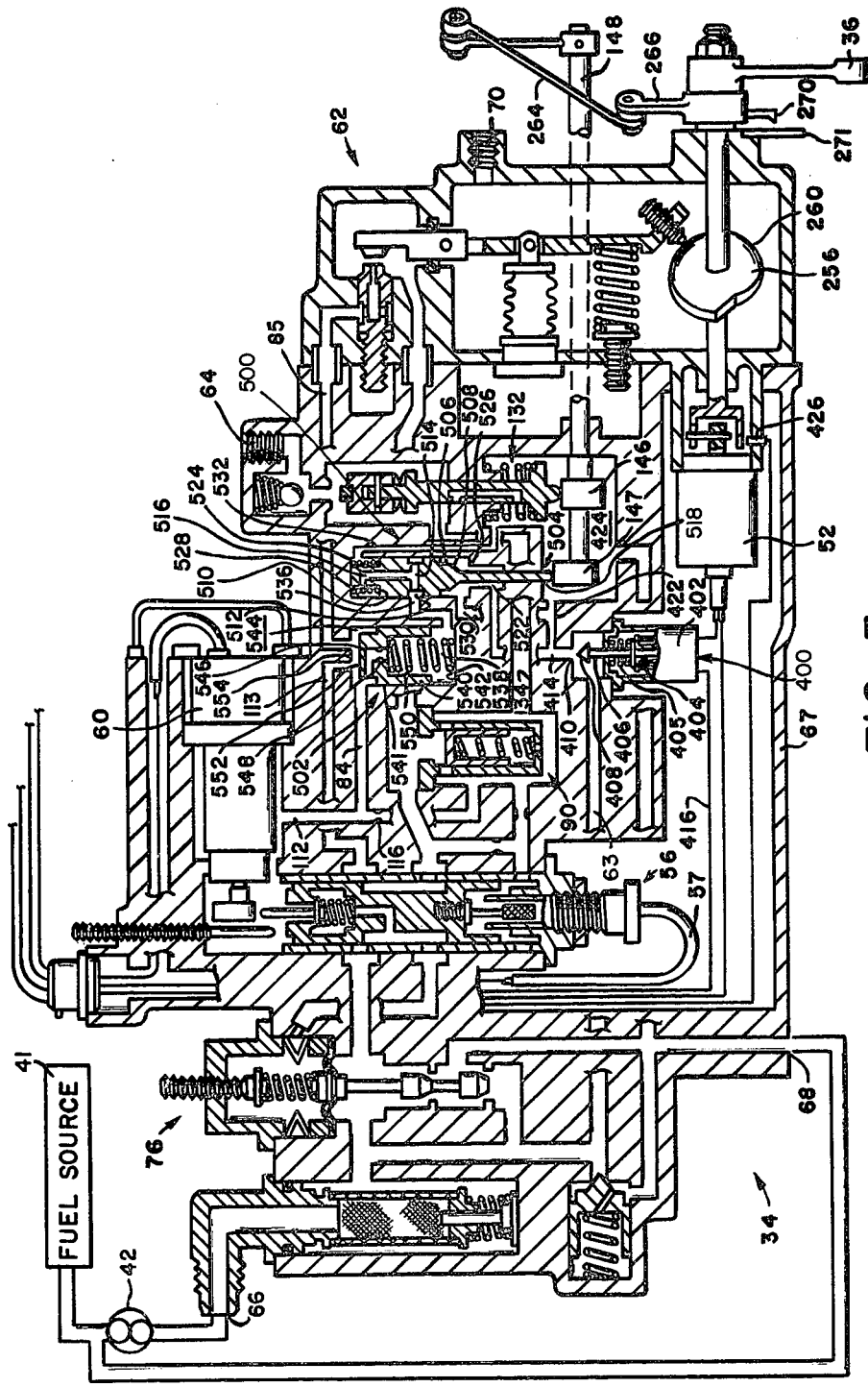
FIG. 3 is a schematic illustration of the fuel control of FIG. 1 with the backup metering valve in operation.

The fuel from conduit 113 present in chamber 101 acts on end 103 of body 102 to move the primary electronic metering valve 56 to a position which allows minimum flow through orifice 86 as shown in FIG. 3. After body 102 is moved to its minimum fuel flow position, fuel flow in conduit 113 is controlled by restrictions 116 in conduit 112 which allows a minimum volume of fuel to be added to the fuel flowing through orifice 86 into the primary supply line 134 for distribution to outlet port 64.

However, this volume of fuel is minimal to the fuel that flows through orifice 206 into chamber 200 since face 226 is positioned away from orifice 206 such that the scheduling of fuel to engine 10 corresponds to that indicated by the position of power lever 36. Thus, once the operation of the fuel control 34 has been shifted to the backup metering valve 62 the operator has complete manual control of the fuel supplied to the engine 10. Until the power lever 36 is brought to the cutoff position where cam 146 moves end 140 on body 138 against seat 142, fuel scheduling is regulated by the relationship of face 226 and nozzle 206 developed by spring 228 urging the lever 204 toward nozzle 206 and bellows 246 modifying such movement as a function of compressor discharge pressure as end 252 follows cam 260. Once the power lever 36 is in the cutoff position, yoke 254 activates switch 426 to release the latching circuit and allow electrical energy to again be presented to solenoid 402.

If an electrical malfunction occurs in the primary metering valve 56 before the power lever reaches the position where cam 147 moves out of contact with stem 518, on deenergization of coil 404, fuel from supply conduit 63 freely flows into bore 528 and acts on end 508 to move groove 512 adjacent passage 536. With passage 536 vented to reservoir 424, the fluid pressure in chamber 538 is reduced to develop a pressure differential across piston 540. This pressure differential acts on surface 541 and moves face 552 away from seat 554 to allow fuel to flow in conduit 85 to the backup metering valve 62. Since the same scheduling cam 260 is used for both the primary and backup metering valves, the fuel flowing to the engine is substantially constant in this situation. Since the movement of body 102 in the primary metering valve occurs at essentially the same time as fuel flows from nozzle 206 into chamber 200 for distribution through conduit 210 to outlet port 64.

Thus, the interaction of the electrical malfunction detection of solenoid 402 in the primary metering valve 52 which allows a transfer signal to be presented to transfer valve arrangement 500 allows an operator to adequately control the scheduling of fuel to an engine without surging during the entire operating range of a power lever.

I claim:

1. In a fuel management system having a primary metering valve and a secondary metering valve through which fuel from a source is supplied to an engine to meet a fuel flow requirement in response to an operational signal applied to a power lever, a transfer valve connected to the power lever for shifting from the primary metering valve to the secondary metering valve on movement of the power lever should a malfunction occur in the primary metering valve, the improvement comprising:
   sensor means for detecting the malfunction to establish a transfer signal;
   control means responsive to said transfer signal for automatically transferring the fuel flow requirement from the primary metering valve to the secondary metering valve without moving the power lever when the fuel flow requirement is below a fixed level;
   a first cam connected to said power lever, said first cam having an operational surface with a first constant rise from a starting point;
   a second cam connected to said control means, said second cam having an operational surface with a constant drop from a starting point;
   linkage for connecting the first and second cams to provide said control means with an operational input corresponding with the fuel flow requirement;
   said control means includes a plunger having a cylindrical body with a first end and a second end, said first end having a stem extending therefrom, said cylindrical body having an annular groove located between the first and second ends, said first end being connected to receive said transfer signal and said second end being connected to a reference signal and
   first resilient means connected to said cylindrical body for urging said first end toward a first seat when fuel flow requirement is above the fixed level, said second cam engaging said stem to hold the first end away from the seat when the fuel flow requirement is below the fixed level.

2. In the fuel management system as recited in claim 1, further including:
   a switching valve located in the conduit connecting the fuel source with the secondary metering valve, said switching valve having a movable wall with a second face thereon; and
   second resilient means for urging said second face against a second seat to prevent the communication of fuel through said conduit in the absence of a transfer signal.

3. In the fuel management system as recited in claim 2, wherein said movable wall includes:
   a passage for connecting a first side of the movable wall to a second opposite side, said first side being connected to said source of fuel; and
   a restriction located in said passage for controlling the flow communication between said first and second sides of the movable wall.

4. In the fuel management system as recited in claim 3, further including:
   a second conduit for connecting said second side of the movable wall to said control valve, said transfer signal acting on said first end to move said annular groove adjacent the second conduit and vent the second side of the movable wall to a control pressure and thereafter establish a pressure differential across the movable wall, said pressure differential overcoming said second resilient means to allow said fuel from the source to flow to the second metering valve.

5. In the fuel management system, as recited in claim 1 wherein said sensor means includes:
   a solenoid having a chamber connected to the source of fuel and to said control means, a plunger with a face that extends into said chamber, and
   a coil surrounding said plunger and connected to a source of electrical energy, said coil receiving electrical energy during the operation of the primary metering valve to hold the face on the plunger against a seat and prevent flow of fuel from the chamber to said control means, said malfunction interrupting the communication of electrical energy to said coil and allowing fuel from the chamber to flow to the control valve to establish said transfer signal.

6. In the fuel management system as recited in claim 5 further including:
   means connected to said source of electrical energy for inhibiting the communication of electrical energy to said coil after a malfunction until the power lever is moved to a shutoff position.

7. In a fuel control having a primary metering valve through which fuel is scheduled from a source to an engine in response to an input signal and a transfer valve for switching the scheduling of fuel to a manually operated backup metering valve on a malfunction in the primary metering valve, the improvement comprising:
   a power lever connected to the primary metering valve for scheduling fuel to an engine in response to an operator input;
   a first cam having a surface thereon corresponding to the fuel flow requirement of the engine over the operating range;
   linkage means connected to said first cam for providing said backup metering with an operational input corresponding to the operator input during operation of the primary metering valve;
   sensor means for detecting a malfunction in the primary metering valve to establish a transfer signal; and
   control means responsive to said transfer signal for automatically transferring the source of fuel from the primary metering valve to the backup metering valve when the fuel flow requirement is below a fixed level to maintain a substantially constant fuel flow to the engine without moving the power lever, said control means including a first valve having a cylindrical body located in a bore of a housing, said cylindrical body having a first area, a second area, and an annular groove, said bore having a first port connected to a reference pressure, a second port connected to said sensor means, and a third port, said reference pressure being communicated to a first area on said cylindrical body,
   a first resilient member for urging said second area toward a seat, and
   a stem connected to said cylindrical body, said linkage means engaging said stem to hold said second area away from said seat when the fuel flow requirement is below the fixed level to allow the transfer signal to be applied to said second area through said second port and move the groove on the cylindrical body into communication with said third port.

8. In the fuel control, as recited in claim 7 wherein said control means further includes:
   a second valve having a piston located in a second bore of the housing to establish a first chamber and a second chamber, first chamber being connected to said source of fuel and said backup metering valve, said second chamber being connected to said third port, said piston having a passage therein to provide a flow path through which fuel from said source is communicated to said first and second chambers;
   a restriction in said passage for controlling the flow communication between said first and second chambers;
   a second resilient for urging said piston toward a seat to interrupt fluid communication between the first chamber and second metering valve.

9. In the fuel control, as recited in claim 8, wherein said sensor means includes:
   a solenoid having a plunger with a face on one end that extends into a conduit connected to the source of fuel, and a coil connected to a source of electrical energy, said electrical energy energizing the coil during the operation of the primary metering valve and moving the face on the plunger into engagement with a seat to prevent communication of fluid from the source to the second port of the first valve.

10. In the fuel control, as recited in claim 9 wherein said sensor means further includes:
    an electrical switch connected to said coil and primary metering valve, said electrical switch responding to an electrical malfunction in the primary metering valve to interrupt communication of electrical energy to said coil and allow said face to move in the conduit and permit fuel from the source to flow to the second port, said fuel from the source acting on the second area of the cylindrical body of the first valve to move the groove adjacent the third port and vent the second chamber of the second valve to create a pressure differential across the piston, said pressure differential acting on said piston to move the piston away from the seat and allow fuel from the source to flow from the first chamber to the backup metering valve.

11. In the fuel control, as recited in claim 10, wherein said sensor means further includes:
    means to inhibit the reactivation of the coil in the solenoid to prevent the switching from the backup metering valve to the primary metering valve until the malfunction is corrected.

* * * * *